(12) United States Patent
Parajon

(10) Patent No.: US 12,092,142 B1
(45) Date of Patent: Sep. 17, 2024

(54) IPR SOLENOID RETAINING NUT

(71) Applicant: Fernando Parajon, Hialeah, FL (US)

(72) Inventor: Fernando Parajon, Hialeah, FL (US)

( * ) Notice: Subject to any disclaimer, the term of this patent is extended or adjusted under 35 U.S.C. 154(b) by 0 days.

(21) Appl. No.: 18/542,576

(22) Filed: Dec. 15, 2023

(51) Int. Cl.
*F16B 37/16* (2006.01)
*F02M 55/04* (2006.01)
*F16B 37/00* (2006.01)
*F16B 39/22* (2006.01)

(52) U.S. Cl.
CPC ............ *F16B 37/00* (2013.01); *F02M 55/04* (2013.01); *F16B 39/225* (2013.01)

(58) Field of Classification Search
CPC ....... F16B 37/047; F16B 39/225; F16B 37/00
See application file for complete search history.

(56) References Cited

U.S. PATENT DOCUMENTS

| | | | | | |
|---|---|---|---|---|---|
| 1,493,293 | A | * | 5/1924 | Timberlake | B63C 9/24 251/356 |
| 1,762,324 | A | * | 6/1930 | Bernard | B25B 13/16 81/102 |
| 2,250,580 | A | * | 7/1941 | Gregory | B24D 7/16 451/548 |
| 2,380,994 | A | * | 8/1945 | Pummill | F16B 39/26 411/959 |
| 2,448,440 | A | * | 8/1948 | King | G01B 3/566 D10/62 |
| 2,520,259 | A | * | 8/1950 | Pummill | F16B 39/26 411/935 |
| 3,384,142 | A | * | 5/1968 | Phelan | F16B 5/01 411/968 |
| 4,431,353 | A | * | 2/1984 | Capuano | B60B 23/08 411/533 |
| 4,654,913 | A | * | 4/1987 | Grube | B21D 53/24 470/18 |
| 4,776,566 | A | * | 10/1988 | Girdley | F16K 5/163 251/328 |
| 4,784,095 | A | * | 11/1988 | Golding | F01M 9/107 123/90.41 |
| 4,925,364 | A | * | 5/1990 | Das | F16B 39/12 411/383 |
| 5,865,581 | A | * | 2/1999 | Sadri | F16B 31/021 411/432 |
| 7,070,725 | B2 | * | 7/2006 | Mathew | B29C 45/1635 264/254 |
| 7,438,603 | B1 | * | 10/2008 | Lewis | G01R 1/0416 439/709 |
| 8,197,167 | B2 | * | 6/2012 | Turner | F16B 31/028 411/533 |
| 9,784,299 | B2 | * | 10/2017 | Dionne | F16B 43/004 |
| 10,677,374 | B2 | * | 6/2020 | Kennedy | F16K 27/044 |
| 10,711,824 | B2 | * | 7/2020 | Archer | F16B 43/001 |
| 10,813,237 | B2 | * | 10/2020 | Schwarz | H05K 5/061 |
| 2019/0120279 | A1 | * | 4/2019 | Wiltgen | F16B 43/00 |

* cited by examiner

*Primary Examiner* — Gary W Estremsky
(74) *Attorney, Agent, or Firm* — Ruben Alcoba, Esq.

(57) ABSTRACT

A solenoid retaining nut that secures a solenoid on an injection pressure regulator. The solenoid retaining nut comprises of a nut that has a top part, a middle part, and a bottom part, the top part is a nut, the middle part is a spacer, and the bottom part is a washer, the solenoid retaining nut defines an inner thread that runs from the top part of the spacer to the top part of the nut, the inner thread is configured to screw on the threads of a shaft of an injection pressure regulator.

2 Claims, 8 Drawing Sheets

IPR SOLENOID RETAINING NUT

TECHNICAL FIELD

The present invention pertains to an injection pressure regulator (hereinafter "IPR") solenoid retaining nut that prevents vehicle engine stall.

BACKGROUND

The present invention is directed to a specialized IPR solenoid retaining nut that is used to retain a solenoid on the shaft of an IPR.

The function of the IPR is to control oil pressure to the injector intensifier piston so that fuel is proportionally controlled at the injectors. If zero voltage is present at the IPR, pressure will be at zero because the solenoid valve (the IPR) will be fully open and return all the oil pumped through the HPOP straight back to the oil pan.

Presently, a solenoid is placed on the shaft of an IPR after the IPR is mounted on a high pressure oil pump (HPOP) of a vehicle, a spacer is placed on the shaft after the solenoid is placed on the shaft, and lastly a nut is tightened on the threads of the shaft of the IPR.

The inventor of the present invention realized that vehicle engine stalls occurs when the nut (a tinnerman nut or a pal nut) that secures the spacer becomes loose or the nut falls off the threads of the shaft of the IPR or when the nut extends outward from a tightened or flush position on the IPR.

The present nut used loosens off the thread in time due to the vibration (engine harmonics) experienced by normal everyday engine operation. The vehicle in which the IPR is mounted experiences a scenario where the nut loosens from the thread of the IPR during the normal use of the vehicle.

The solenoid is secured at initial flush position on the IPR shaft so that the magnetic field created by the solenoid can interact with the internal pins of the IPR to regulate the high pressure oil side of the 7.3 l power stroke engine. When the solenoid moves away from its initial flush position (slides outward from the middle of the shaft), the function of the IPR is reduced until engine stall scenario is reached. When stall is reached, the engine will cease running, the power steering function will greatly diminish, and the brakes will not function in a safe and efficient manner.

The inventor of the present invention realized that some downfalls of the IPR were due to the loosening of the nut. The nut has a reduced amount of thread that can be secured to the thread of the shaft of the IPR.

The inventor of the present invention conceived that if he increased the amount of thread that would contact the thread of the shaft of the IPR, that he would greatly minimize the engine stalls that are due to the tinnerman nut loosening from the thread of the IPR.

The present invention is a nut that is engineered to capture the maximum amount of thread of the shaft of the IPR (~6 threads).

The present invention addresses the need of having an IPR solenoid retaining nut that can capture the maximum thread of the shaft of an IPR.

SUMMARY

The present invention is directed to an IPR solenoid retaining nut that helps prevent vehicle failure.

The solenoid retaining nut secures a solenoid on an injection pressure regulator. The solenoid retaining nut comprises of a nut that has a top part, a middle part, and a bottom part, the top part is a nut, the middle part is a spacer, and the bottom part is a washer, the solenoid retaining nut defines an inner thread (0.3150" in length) that runs from the top part of the spacer to the top part of the nut, the inner thread is configured to screw on the threads of a shaft on an injection pressure regulator.

An object of the present invention is to prevent a solenoid that is mounted on an IPR from moving away from an initial flush position.

Another object of the present invention is to provide a solenoid retaining nut that will prevent engine stalls.

Yet another object of the present invention is to provide a solenoid retaining nut that will greatly lower the chances of steering failure as a result of engine stall.

Yet still another object of the present invention is to provide a solenoid retaining nut that will greatly lower the chances of brake failure as a result of engine stall.

A further object of the present invention is to provide a solenoid retaining nut that will prevent the injectors of a vehicle from malfunctioning.

BRIEF DESCRIPTION OF THE DRAWINGS

These and other features, aspects, and advantages of the present invention will become better understood with regards to the following description, appended claims, and drawings where:

DESCRIPTION

Figure 1:
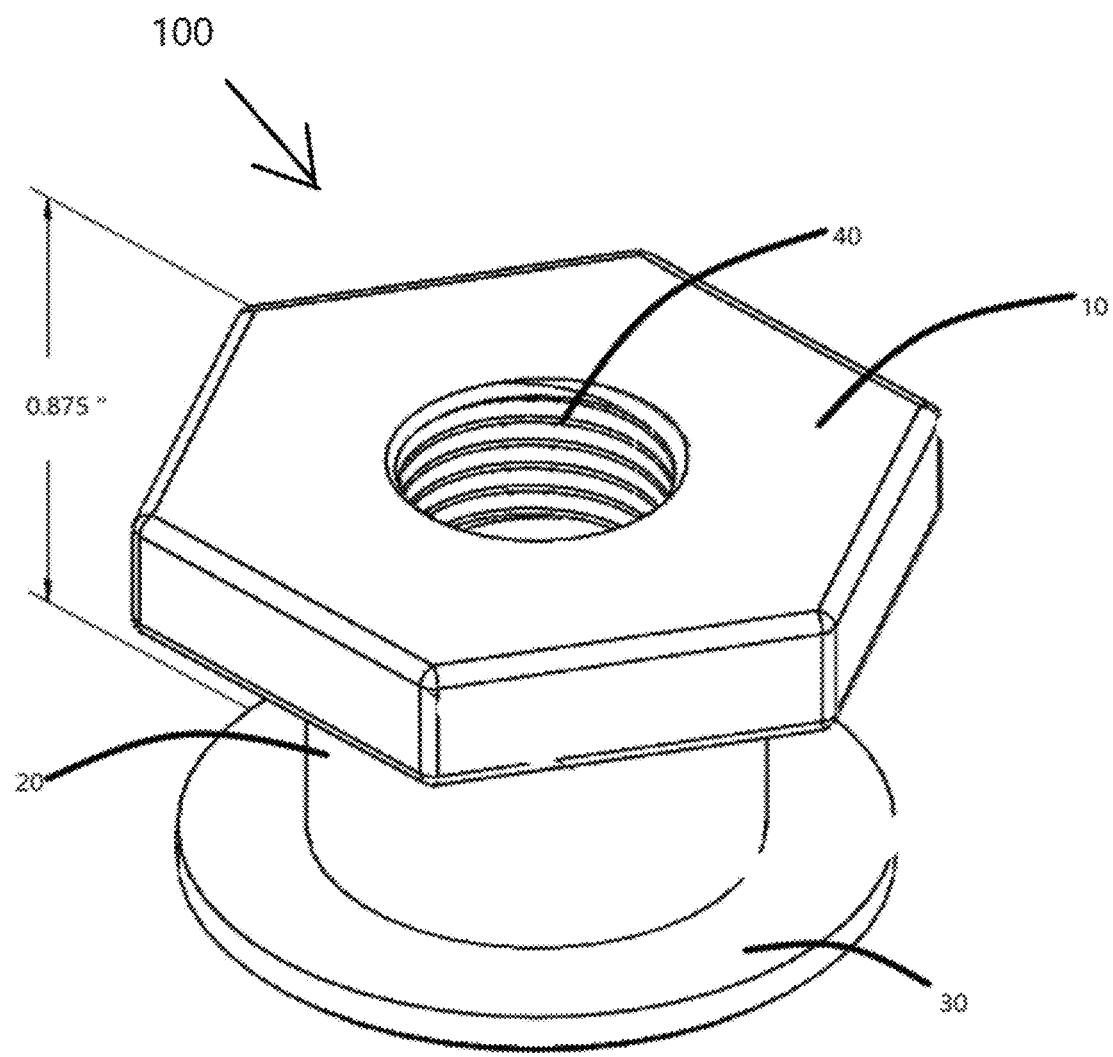
FIG. 1 is a perspective view of the present invention.
Figure 2:
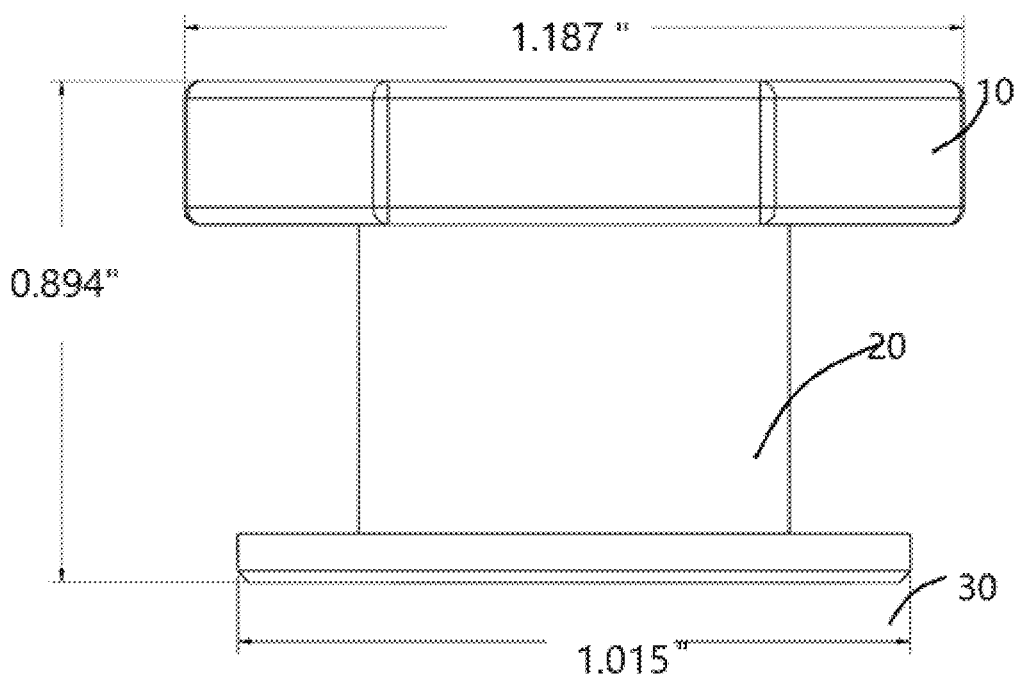
FIG. 2 is a side view of the present invention.
Figure 3:
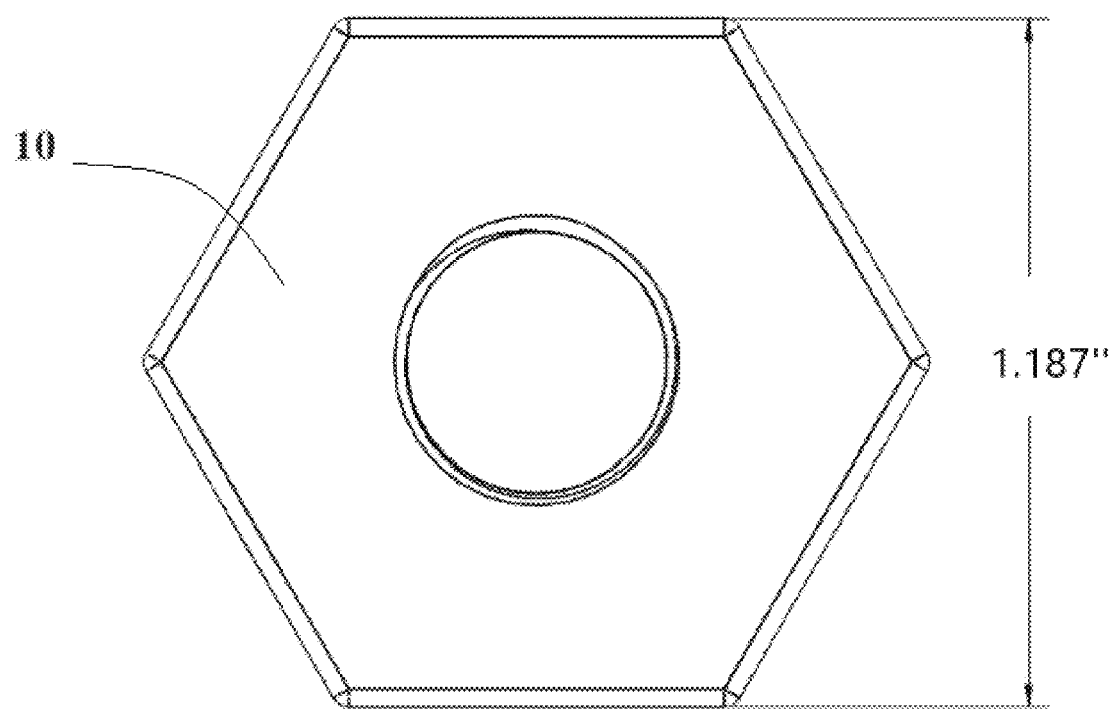
FIG. 3 is a top view of the present invention.
Figure 4:
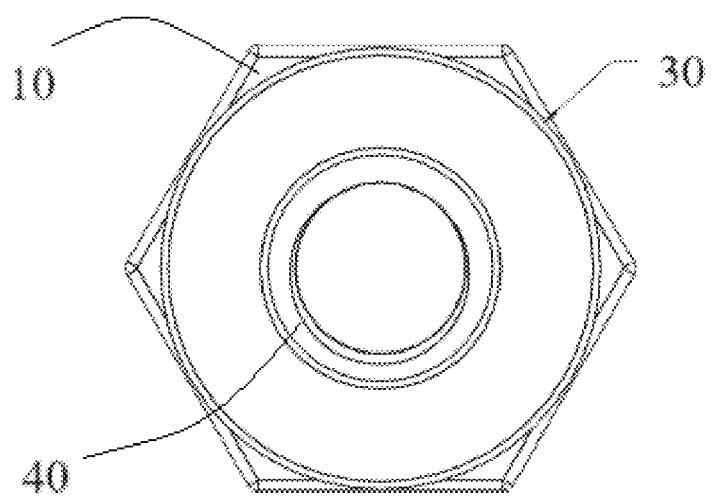
FIG. 4 is a bottom view of the present invention.
Figure 5:
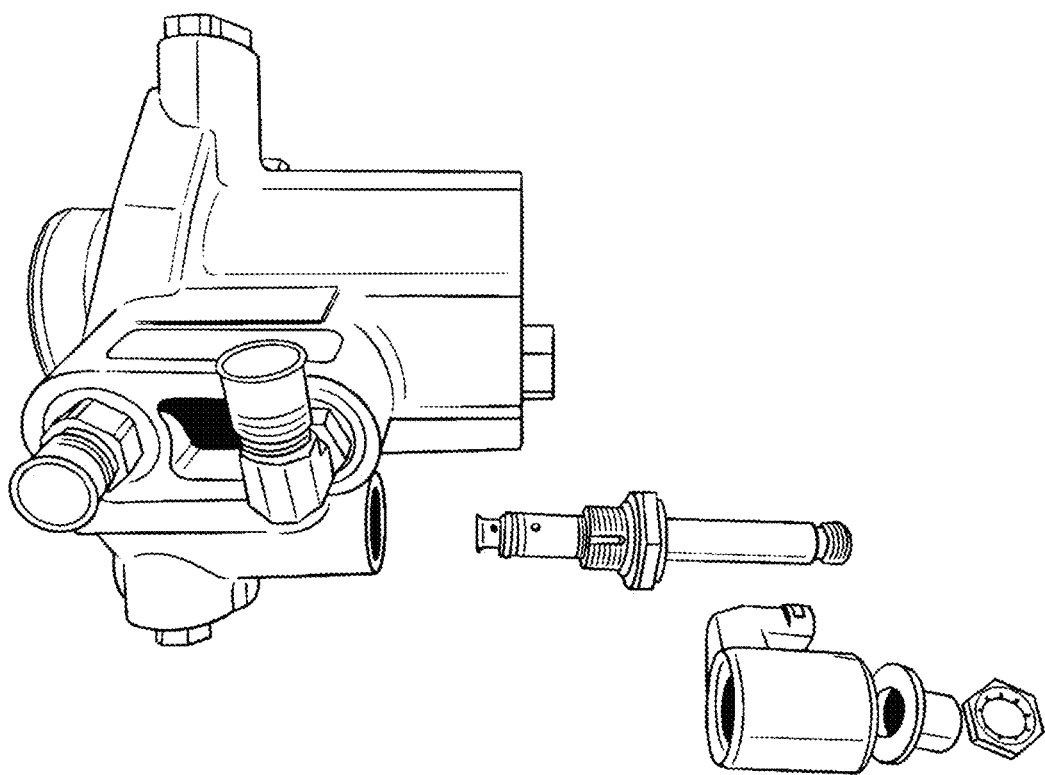
FIG. 5 is an exploded side view picture of the prior art that shows how the tinnerman nut is mounted on a high pressure oil pump (HPOP)
Figure 6:
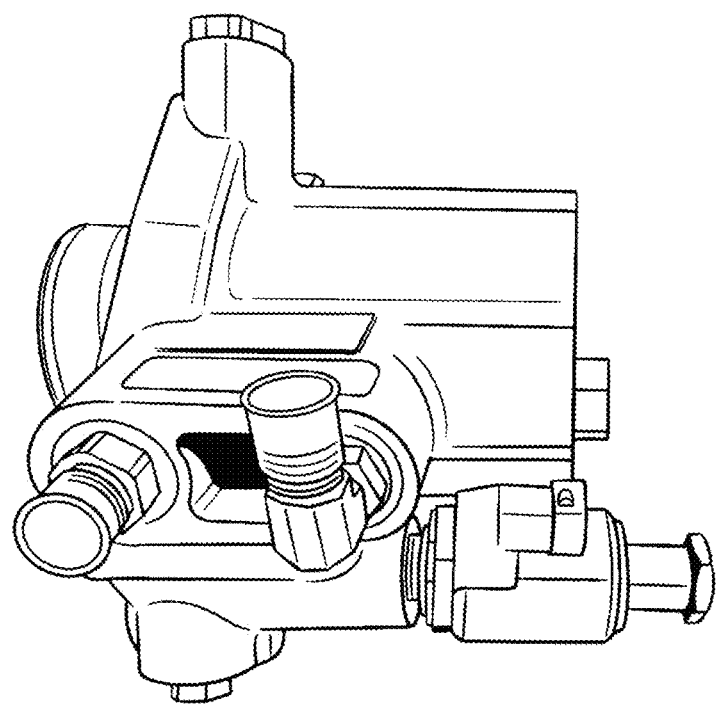
FIG. 6 is a side view picture that shows the tinnerman nut was secured to the IPR.
Figure 7:
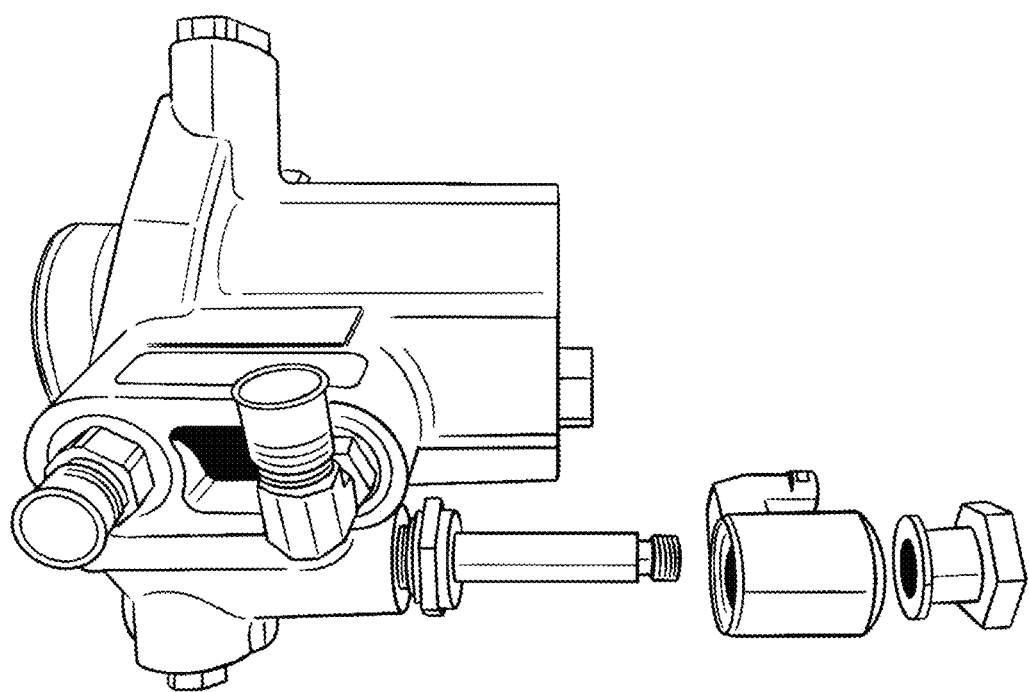
FIG. 7 is am exploded side view picture that shows how the IPR solenoid retaining nut is mounted on a HPOP.

As seen in FIGS. 1-4, the present invention is an IPR solenoid retaining nut that prevents vehicle engine stall.

The IPR solenoid retaining nut 100 comprises a top part 10, a middle part 20, and a bottom part 30, the top part 10 is a nut, the middle part 20 is an annular spacer, and the bottom part 30 is a cylindrical planar washer, The cylindrical planar washer is directly adjacent and perpendicular to the annular spacer, the solenoid retaining nut 100 defines an inner thread 40 that runs from the top part of the annular spacer 20 to the top part 10 of the nut, the inner thread has six threads, the inner thread 40 measures 0.3150 of an inch in length, the inner thread is configured to screw on the threads of a shaft of an injection pressure regulator.

In a preferred embodiment, the nut has a diameter of 1.187 inches, the solenoid retaining nut has a height of 0.894 inches, and the cylindrical planar washer has a diameter of 1.015 inches.

Figure 8:
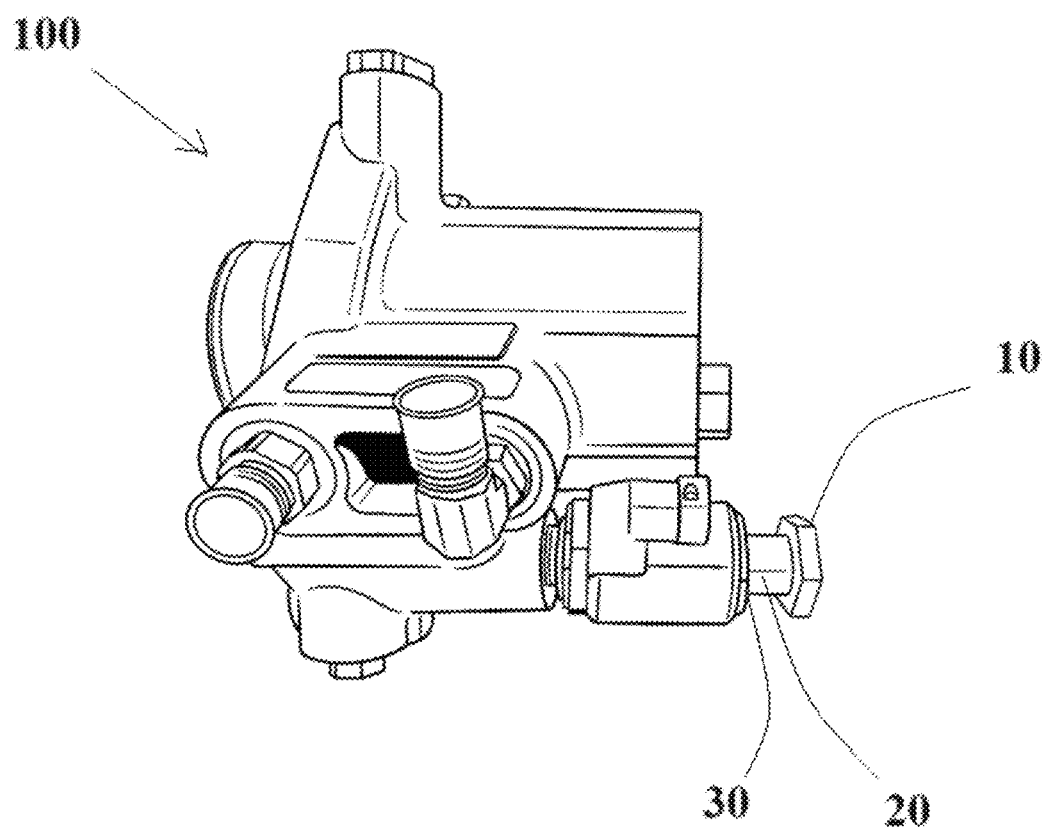
FIG. 8 is a side view picture that shows how the present invention is secured to the IPR.

In a preferred embodiment of the present invention, as seen in FIG. 8, the invention is an IPR solenoid assembly 100 that comprises the IPR retaining nut of claim 1.

The inner thread of the present invention captures more of the threads of the shaft of the IPR, thereby a greater torque can be applied to the solenoid that is mounted on the shaft of the IPR, this in turn lowers the chances of the solenoid from moving from an initial flush solution. In a preferred embodiment, a locking glue can be applied to the inner threads of the present invention prior to the mounting of the nut on the shaft of the IPR. It is proven that the present invention will allow for an increase of torque to be applied to the solenoid of double of what the tinnerman nut currently allows.

An advantage of the present invention is that it prevents a solenoid mounted on an IPR from moving away from an initial flush position.

Another advantage of the present invention is that it provides a solenoid retaining nut that prevents engine stall.

Yet another advantage of the present invention is that it provides a solenoid retaining nut that greatly lowers the chances of steering failure due to engine stall.

Yet still another advantage of the present invention is that it provides a solenoid retaining nut that greatly lowers the chances of brake failure due to engine stall.

A further advantage of the present invention is that it provides a solenoid retaining nut that prevents the injectors of a vehicle from malfunctioning.

The embodiments of the IPR solenoid retaining nut described herein are exemplary and numerous modifications, combinations, variations, and rearrangements can be readily envisioned to achieve an equivalent result, all of which are intended to be embraced within the scope of the appended claims. Further, nothing in the above-provided discussions of the IPR solenoid securing nut should be construed as limiting the invention to an embodiment or a combination of embodiments. The scope of the invention is defined by the description, drawings, and claims.

What is claimed is:

1. An injection pressure regulator assembly that comprises:
   an injection pressure regulator that has a threaded shaft; and
   a nut that has a top part, a middle part, and a bottom part, the top part is a nut, the middle part is an annular spacer, and the bottom part is a cylindrical planar washer, the cylindrical planar washer is directly adjacent and perpendicular to the annular spacer, the solenoid retaining nut defines an inner thread that runs from the top part of the annular spacer to the top part of the nut, the inner thread has six threads, the inner thread is configured to screw on a thread of a shaft of an injection pressure regulator, the inner thread measures 0.3150 of an inch in length, the nut is screwed on the threaded shaft after a solenoid is mounted on the threaded shaft.

2. The injection pressure regulator assembly of claim 1, wherein the nut has a diameter of 1.187 inches, the solenoid retaining nut has a height of 0.894 inches, and the cylindrical planar washer has a diameter of 1.015 of an inch.

* * * * *